3,495,625
Patented Feb. 17, 1970

3,495,625
ROTARY FLUID FLOW CONTROL VALVE ASSEMBLY
Peter Shuttleworth, Hornsea, and Eric Norman, Hull, England, assignors to Mastabar Mining Equipment Company Limited, Marfleet, Hull, Yorkshire, England
Filed Apr. 21, 1967, Ser. No. 632,768
Int. Cl. F16k *39/06, 35/00, 51/00*
U.S. Cl. 137—637.4                9 Claims

ABSTRACT OF THE DISCLOSURE

The invention resides primarily in a rotary selector valve assembly for use in directing high pressure fluid to required positions of use, as in the selective operation of a number of associated hydraulic devices and, in order to offset the pressure loading which the fluid itself exerts on the selector valve and which makes the valve difficult to turn, the invention employs a pressure balancing piston connected to the valve for applying thereto, a force opposed to that produced on the valve by the pressure fluid loading. The invention also provides a resiliently closed shut-off valve in the assembly for controlling the admission of pressure fluid to the selector valve and the balancing piston of the latter is used to guide a thrust pin which must be held manually displaced to unseat the shut-off valve, thus providing for a dead man action. The assembly further conveniently includes a pressure release valve having a resilient annular valve seat internally circumscribing a fluid exhaust passage and closable by compressive engagement of an axially displaceable cylindrical piston, movement of which through the valve seat is followed by an axially aligned, adjoining thimble acting to support said seat against blow-out or extrusion by the fluid pressure.

---

Figure 1:
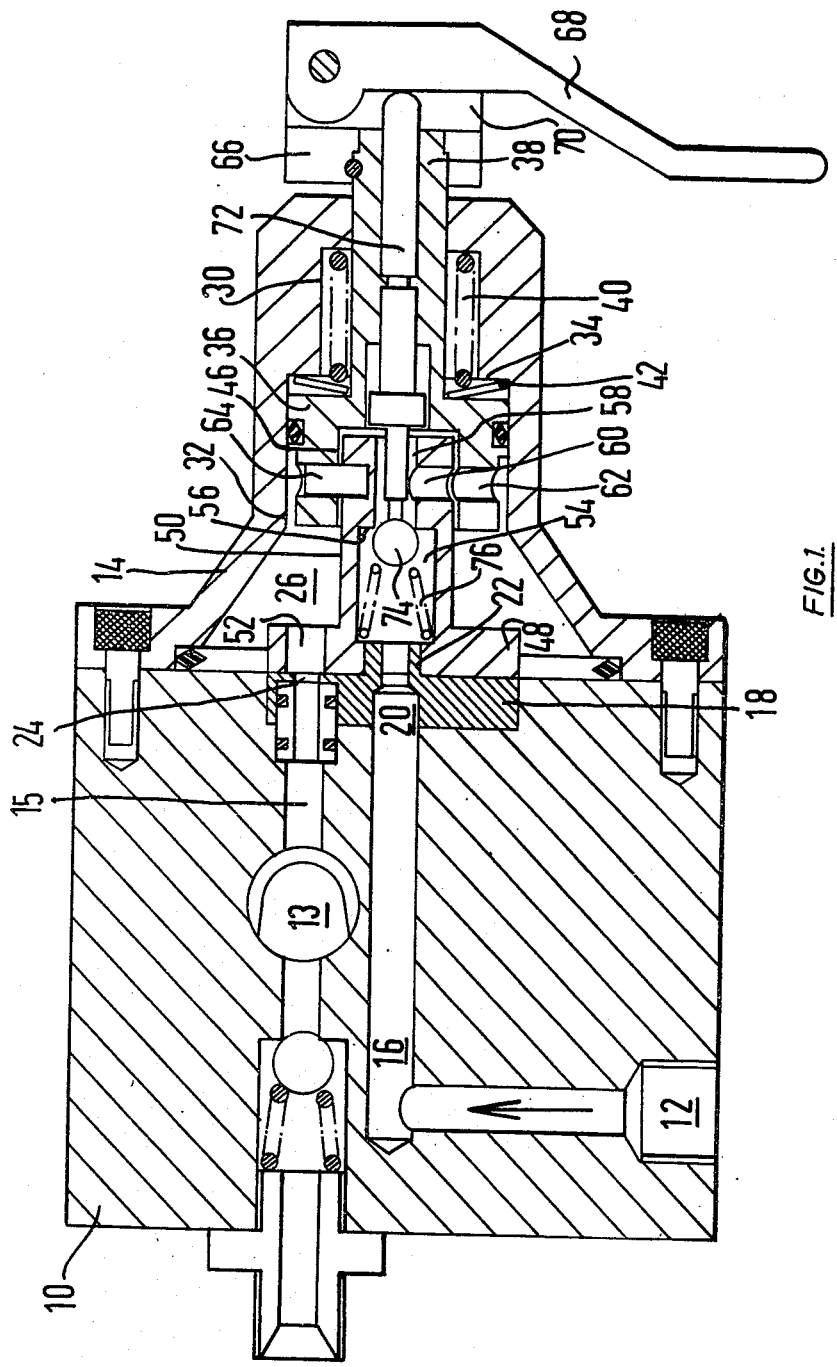

This invention concerns fluid flow control valves.

The control of hydraulically powered apparatus frequently requires that a supply of pressure fluid shall be capable of being directed selectively to a number of different positions of use. One example of such apparatus is a self advancing mine roof support, wherein the operating pressure fluid requires to be selectively directed to telescopic roof supporting props and to a horizontally arranged, double-acting ram for effecting relative movement between the support and a cooperating structure such as a conveyor serving to carry material away from the face being worked. It has already been proposed to employ rotary control valves for directing pressure fluid to required positions in hydraulically powered apparatus, but the performance of such valves has not hitherto always been satisfactory, due partly to the pressure loading which the rotary member of the valve experiences from the fluid pressure acting on it and which, in addition to making it quite difficult to operate the valve, produces accelerated wear of the sealing face of the rotary member with consequent leakage from the valve.

The invention therefore seeks to provide a rotary fluid flow control valve which is of relatively simple and robust construction, easily serviced for the replacement of damaged or worn parts and in which turning of the rotary member of the valve is facilitated.

According to the present invention, in a rotary fluid flow control valve assembly including a rotary selector member for selectively directing pressure fluid entering the valve to a plurality of fluid outlets, there is provided piston means exposed simultaneously with the selector member to the fluid pressure and coupled to the selector member for applying to the same, a force opposed to that applied by the pressure fluid, and a normally resiliently closed shut-off valve serving to control the admission of pressure fluid to the assembly and acting in opposition to manually operated shut-off valve opening means for returning said opening means to an inoperative condition whenever the manual operating force is removed.

According to a preferred embodiment of the invention, a rotary fluid flow control valve assembly comprises a body member formed with a fluid inlet and a plurality of fluid outlets, passage means in the body member including a rotary selector for selectively directing fluid from said inlet to said outlets, a shut-off valve in said passage means including a valve closure member resiliently urged against a valve seat, manually displaceable thrust means for unseating said closure member to permit the flow of fluid from said inlet to said rotary selector, and piston means effective when subjected to the pressure of fluid flowing through said shut-off valve to apply a force to said rotary selector in opposition to that applied to said selector by the same fluid pressure.

The thrust means may conveniently be a pin arranged coaxially with the shut-off valve seat and freely displaceable by an external operating handle towards and away from the seat, the arrangement being such that on manual displacement the pin is moved towards the valve seat to unseat the closure member, but when the manual effort is discontinued, the resilient movement of the closure member on to the valve seat also restores the pin and the operating handle into their respective rest or unoperated conditions. In this way, the operating handle of the valve is effectively a so-called dead man handle.

Preferably the rotary selector comprises a disc portion having a hollow axial stem housing a valve ball constituting the closure member of the shut-off valve, the outer end of the stem being formed with an annular valve seat and a spring being provided within the stem to urge the ball on to the seat. In such an arrangement, the piston means may be a cup-shaped piston embracing and pinned to the stem of the rotary selector disc, the piston also providing a mounting for the thrust pin by which the closure ball is moved off its seat.

Figure 2:
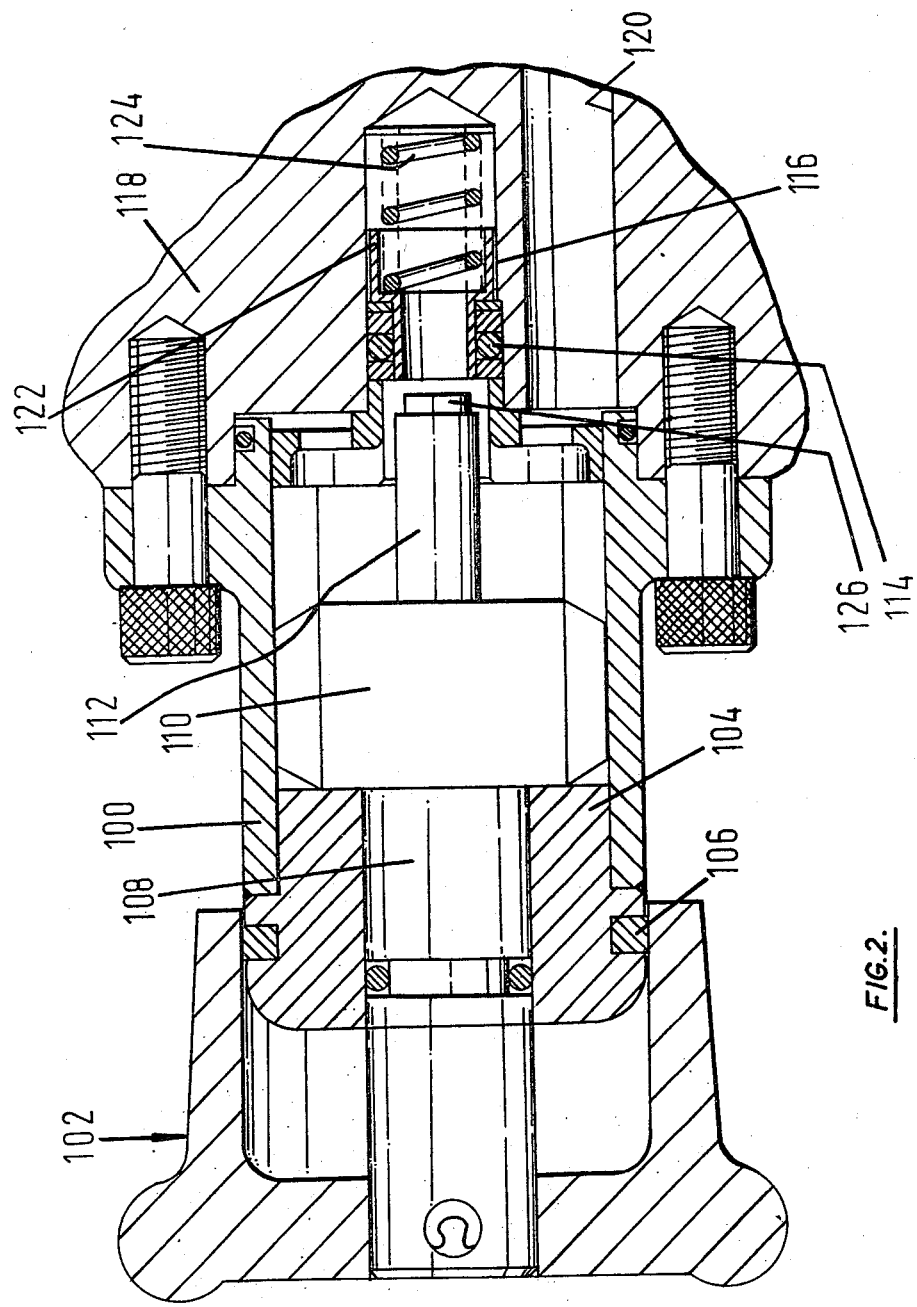
Figure 3:
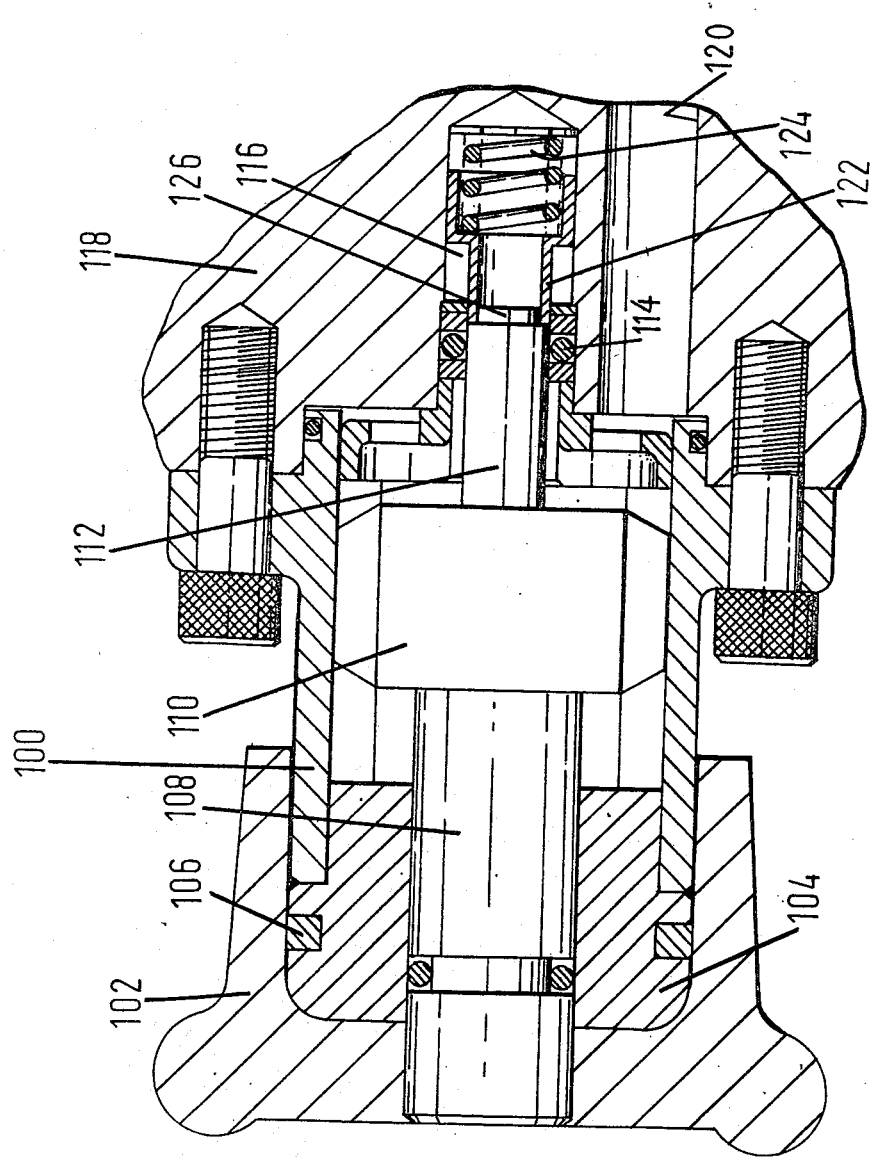

The invention will be described further, by way of example with reference to the accompanying drawings, in which:

FIG. 1 is an axial section through one rotary fluid flow control valve assembly embodying the invention, and FIGS. 2 and 3 are axial sections respectively showing the open and closed condition of a pressure fluid release valve for use with the invention.

The valve assembly shown in FIG. 1 of the drawings is provided with a two-part body member comprising a valve block 10 formed with an inlet or supply port 12 for incoming pressure fluid and with a plurality of outlet ports for directing the pressure fluid to different positions of use, only one outlet port 13 being visible in the drawing, and an open-ended cover 14 which is bolted in fluidtight relation on the block 10. The inlet port 12 connects with an inlet passage 16 running centrally of the valve block 10 and this inlet passage 16 extends towards the end face of the block 10 which is closed by the cover 14, where it registers with an axial bore 20 formed in an annular insert 18 recessed into the said end face, the insert 18 having an axially directed spigot portion 22 which projects into the mouth of the cover 14. At a radially outer region, the insert 18 is formed with a plurality of circularly distributed bores each connecting with a passage in the valve block 10 leading to one of the outlet ports, and one such bore 24 connecting with a passage 15 leading to the outlet port 13 is visible in the drawing.

It will be noted that the cover 14 is generally cylindrical in shape but that at its mouth it is flared or outwardly divergent to a size and shape corresponding to that of the cooperating end face of the valve block 10. The flared mouth portion of the cover 14 cooperates with the valve block in defining a chamber 26, while the cylindrical free end portion of the cover is internally bored at 30 and counterbored at 32, a shoulder 34 being situated between the bore 30 and the counterbore 32. Through the axial end wall of the cover 14 there extends the piston rod 38 of a piston 36 which is slidable in the counterbore 32 and which is normally urged in a direction towards the valve block 10 by a compression spring 40 arranged in the bore 30 and by a disc spring 42 positioned between the shoulder 34 and the rear face of the piston 36. The front face of the piston 36 is formed with an axial recess 46, and within this recess 46 is received the stem 50 of a rotatable valve spool 48. The valve spool 48 in turn is axially bored to receive and locate upon the spigot portion 22 of the insert 18, and is formed in its radially outer region with a plurality of apertures for registering one with each of the insert apertures 24, only one of the valve spool apertures being shown in the drawing and being indicated at 52. The spool stem 50 has a hollow interior 54 formed with a valve seat 56, and an axial bore 58 in the stem connects the hollow interior 54 with a radial port 60 which registers with a similar port 62 opening from the axial recess 46 of the piston 36. A pin 64 is passed through the piston 36 and the spool stem 50 in order to maintain the two in rotationally fixed relation.

The outer end of the piston rod 38 extends out of the free end face of the cover 14 and there has rotationally fixed to it, a boss 66 constituting a pivotal mounting for a manually displaceable operating handle 68 which is pivotally movable in a diametral slot 70 of the boss 66. Into this slot 70 there also projects the free end of a thrust pin 72 passing through the axial bore of the piston rod 38, the opposite end of the thrust pin 72 passing through the axial bore 58 in the spool stem 50 to contact a valve ball 74 resiliently urged on to the valve seat 56 by a compression spring 76 housed within the stem interior 54.

In the operation of the control valve assembly provided by the invention, it will be seen that when a supply of pressure fluid is connected to the inlet port 12, the fluid will pass into the valve block 10 and along the passage 16 as far as the interior 54 of the spool stem 50 but that it can pass no further while the valve ball 74 remains seated. The valve ball 74 and its seat 56 thus constitute a shut-off valve controlling the admission of pressure fluid to the remainder of the assembly. If the handle 68 is then pivoted to axially displace the thrust pin 72 and unseat the valve ball 74, the pressure fluid is enabled to pass through the axial bore 58 of the spool stem and through the radial ports 60 and 62 into the chamber 26. Dependent upon the rotational position of the valve spool 48, as determined by rotation of the handle 68, fluid admitted to the chamber 26 is then passed to a selected one of the outlet ports in the block 10, and in the drawing, fluid would be passed to the outlet port 13 through the aperture 52 in the spool 48 and through the registering aperture 24 in the insert 18. The spool 48 thus constitutes a rotary selector member for distributing the fluid entering the valve assembly to a required position of use, and it will be noted that the whole control of the assembly is effected from the single control handle 68. The arrangement is such, however, that fluid cannot be admitted to the chamber 26 until the shut-off valve 56, 74 is opened by a positive manual effort applied to pivot the handle 68 relative to the boss 66, and immediately that manual effort is discontinued, the compression spring 76 acts to close the shut-off valve and to restore the handle 68 to its unoperated position, the handle 68 thus effectively being a dead man handle.

Turning now to the rotational action of the valve assembly in moving the spool 48 to its required rotational position, it will be appreciated that, although the pressure of the incoming fluid is applied to the exposed face of the spool 48 and thus urges the spool against the insert 18, a counter pressure is applied to the piston 36 and serves both to facilitate the manual turning of the spool by way of the handle 68 and also, by reducing the total force with which the spool bears against the insert 18, to reduce the rate of wear between the two and thereby the frequency with which they need to be replaced in order to preserve efficient operation of the assembly. When wear does dictate replacement, however, it is merely necessary to remove the cover 14 in order to renew the insert 18, whilst the cover itself contains the remaining operative parts and can be replaced as a complete sub-assembly. The provision of the pressure-balancing piston 36 enables the position of the spool to be changed even when there is pressure fluid in the chamber 26, but when no fluid pressure exists in chamber 26, the spool is still maintained properly seated against the insert 18 by the combination of the compression spring 40 and the disc spring 42, which then represent the only pressure against which the spool has to be turned. The disc spring 42 conveniently has a high rate of spring loading, thereby permitting very little end movement of the piston 36 and the spool 48 and so guarding against the possibility of vibrations occurring in the assembly during the presence of pressure fluid.

Referring now to FIGS. 2 and 3 of the drawings, the pressure fluid release valve shown therein is particularly suitable for use in conjunction with the rotary control valve previously described, in the control and operation of hydraulic mine roof supports, in that the rotary control valve is intended in such a situation to control operations such as the elevating and setting of the individual props of the support together with the advancing movement of the support effected by the usual horizontal ram, while the release valve is intended to release the pressure fluid from the props whenever they require to be lowered, the two valves conveniently being embodied in a common valve block.

As shown in FIGS. 2 and 3, the release valve includes an externally threaded cylindrical housing 100 on which is engaged a rotatable control knob 102, the extent to which the knob 102 can be screwed on to the cylinder 100 being limited by a plug member 104 closing the outer end of the cylinder 100. A sealing ring 106 is provided between the plug member 104 and knob 102. The knob 102 carries an axial piston rod 108 slidingly engaged in fluid sealed relation in the plug member 104. Within the cylinder 100, the piston rod carries a two-part piston having a first and larger diameter part 110 in sliding engagement with the cylinder wall and a second, axially extending and smaller diameter part 112 constituting a closure member for a valve seat in the form of a resilient O-ring 114 located in a bore 116 of a valve block 118. The bore 116 communicates with the pressure fluid to be reduced by passage means (not shown) and itself forms part of a pressure fluid exhaust passage in the valve block which is completed by a further bore 120 communicates with exhaust in the valve block 118 and communicating with the bore 116 by way of the interior of the cylinder 100. Within the bore 116 and upstream of the valve seat 114, there is arranged a hollow cylindrical thimble 122 which is urged by a spring 124 towards the valve seat and which follows the axial movement of the closure member 112 as the control knob 102 is turned. The thimble 122 engages a reduced diameter end portion 126 of the closure member 112 whenever the latter is in or is being moved towards its closed position and thus serves to protect the seat against possible blow-out or extrusion under the action of the fluid pressure being sealed.

It will be appreciated that, when the closure member 112 occupies the position shown in FIG. 2 the bore 116 communicates with the interior of the cylinder 100 and thence to the exhaust bore 120 to relieve pressure upstream of the valve. However, by rotating the knob 102 and moving the closure member 112 towards the valve seat 114, the communication between bore 116 and bore 120 is restricted and finally cut-off.

We claim:

1. A rotary fluid control valve assembly comprising a body member formed with a fluid inlet and a plurality of fluid outlets, passage means in the body member including a rotary selector for selectively directing fluid from said inlet to said outlets, a seat against which the selector is urged in one direction by the pressure of fluid admitted to the valve assembly, a shut-off valve in said passage means including a valve closure member resiliently urged against a valve seat, manually displaceable thrust means for unseating said closure member to permit the flow of fluid from said inlet to said rotary selector, and piston means effective when subjected to the pressure of fluid flowing in said shut-off valve to apply a force to said rotary selector in a second direction opposite to that applied to said selector by the pressure fluid in said first direction to thereby reduce to a significant degree the seating force urging the selector on its seat, said piston means being unexposed to any substantial fluid pressure acting on the piston means in said first direction so that the fluid pressure acting on said piston means in said second direction remains substantially unbalanced with respect to forces on the piston means so as to produce a net force on said piston means acting in said second direction tending to unseat said rotary selector.

2. A control valve assembly as set forth in claim 1, in which the thrust means is a pin arranged coaxially with the shut-off valve seat and freely displaceable by an external operating handle towards and away from said seat, the arrangement being such than an manual displacement the pin is moved towards the valve seat to unseat the closure member but that when the manual effort is discontinued, the resilient movement of the closure member on to the valve seat also restores the pin and the operating handle into their respective rest or unoperated conditions.

3. A control valve assembly as set forth in claim 1, in which the rotary selector comprises a disc portion having a hollow axial stem housing a valve ball constituting the closure member of the shut-off valve, the stem being formed internally with an annular valve seat and a spring being provided in the stem to urge the ball on to the seat.

4. A control valve assembly as set forth in claim 3, in which the piston means is a cup-shaped piston embracing and pinned to the stem of the rotary selector disc, said piston further providing a guide for the thrust pin by which the valve closure ball is moved off its seat.

5. A control valve assembly as set forth in claim 1, in which said body member is of multiple part construction including a first part formed with said fluid inlet and outlets and provided with a seat co-operating with the rotary selector, and a second part in the form of an internally hollow end cap or equivalent member constituting a replaceable sub-assembly containing said piston means, said shut-off valve and said thrust means.

6. A rotary fluid flow control valve assembly comprising in combination, a rotary selector member for selectively directing pressure fluid entering the valve to one of a plurality of fluid outlets, a seat for the selector member and against which the latter is urged in one direction by the pressure of the fluid admitted to the valve assembly, piston means exposed simultaneously with the selector member to the fluid pressure and coupled to the selector member for applying to the same, a force acting in a second direction opposite to said first direction to thereby reduce to a significant degree the seating force urging the selector member on its seat, said piston means being unexposed to any substantial fluid pressure forces acting on the piston means in said first direction so that the force acting on the piston means in said second direction remains substantially unbalanced with respect to forces on the piston means such that a net force is produced on said piston means in said second direction tending to unseat said rotary selector member, a normally resiliently closed shut-off valve means serving to control the admission of pressure fluid to the assembly, manually operable shut-off valve-opening means for opening said shut-off valve means, said shut-off valve means acting in opposition to said valve opening means for returning said valve opening means to an inoperative condition whenever the manual operating force is removed from the valve opening means.

7. The combination with a rotary control valve as set forth in claim 6 of a pressure fluid release valve comprising a resilient annular valve seat arranged intermediate inlet and outlet ends of a fluid exhaust passage and a cylindrical valve closure member axially displaceable towards and away from said valve seat for compressively engaging within the same to seal said exhaust passage.

8. A combination as set forth in claim 7, in which the valve closure member is a piston axially displaceable relative to the resilient valve seat and wherein a hollow cylindrical thimble or equivalent member in axial alignment with the piston in the exhaust passage is resiliently biased towards said piston and the valve seat and is arranged to follow the piston movement through the valve seat for supporting the latter against blow out or extrusion by the fluid pressure.

9. A control valve assembly as set forth in claim 1 wherein the shut-off valve further includes, a rotatable and longitudinally movable actuating stem connected to said closure member to rotate the closure member on said seat, said piston means being fixed to said actuating stem to present a sufficient pressure reactant surface for receiving a fluid pressure force in a direction tending to longitudinally move said stem and unseat said closure member.

References Cited

UNITED STATES PATENTS 2,636,513   4/1953   Schmid _____ 137—614.17

FOREIGN PATENTS 231,973   1/1961   Australia.
959,716   6/1964   Great Britain.

WILLIAM F. O'DEA, Primary Examiner

H. M. COHN, Assistant Examiner

U.S. Cl. X.R.

137—614.17, 614.19; 251—283